US010816363B2

(12) United States Patent
Ruigrok et al.

(10) Patent No.: US 10,816,363 B2
(45) Date of Patent: Oct. 27, 2020

(54) ANGULAR SENSOR SYSTEM AND METHOD OF STRAY FIELD CANCELLATION

(71) Applicant: NXP B.V., Eindhoven (NL)

(72) Inventors: Jaap Ruigrok, Asten (NL); Edwin Schapendonk, Oss (NL); Stephan Marauska, Kaltenkirchen (DE); Dennis Helmboldt, Halstenbek (DE); Marijn Nicolaas van Dongen, Utrecht (NL)

(73) Assignee: NXP B.V., Eindhoven (NL)

( * ) Notice: Subject to any disclaimer, the term of this patent is extended or adjusted under 35 U.S.C. 154(b) by 131 days.

(21) Appl. No.: 15/906,125

(22) Filed: Feb. 27, 2018

(65) Prior Publication Data

US 2019/0265071 A1 Aug. 29, 2019

(51) Int. Cl.
*G01B 7/00* (2006.01)
*G01D 5/16* (2006.01)
(Continued)

(52) U.S. Cl.
CPC .............. *G01D 5/16* (2013.01); *G01D 5/145* (2013.01); *G01D 5/24476* (2013.01)

(58) Field of Classification Search
CPC .......... G01D 5/145; G01D 5/147; G01D 5/12; G01D 5/14; G01D 5/16; G01D 5/165; G01D 5/2457; G01D 5/2013; G01D 5/2046; G01D 5/24476; G01D 5/245; G01R 33/025; G01R 33/07; G01R 33/0206;
(Continued)

(56) References Cited

U.S. PATENT DOCUMENTS 5,880,586 A * 3/1999 Dukart .................. G01D 5/145
324/207.2
6,972,558 B1 12/2005 Robinson
(Continued)

FOREIGN PATENT DOCUMENTS

EP 3 587 775 A1 1/2020
WO WO-2006/106490 A2 10/2006
(Continued)

OTHER PUBLICATIONS

U.S. Appl. No. 15/941,216, not yet published; 32 pages (filed Mar. 30, 2018).
(Continued)

*Primary Examiner* — Thang X Le
(74) *Attorney, Agent, or Firm* — Charlene R. Jacobsen (57) ABSTRACT

A system for determining angular position includes a magnet having at least four poles and an axis of rotation, wherein the magnet produces a magnetic field. A first magnetic field sensor produces a first output signal and a second magnetic field sensor produces a second output signal in response to the magnetic field. The magnetic field sensors are operated in a saturation mode in which the magnetic field sensors are largely insensitive to the field strength of the magnetic field. Thus, the first output signal is indicative of a first direction of the magnetic field and the second output signal is indicative of a second direction of the magnetic field. Methodology performed by a processing circuit entails combining the first and second output signals to obtain a rotation angle value of the magnet in which angular error from a stray magnetic field is at least partially canceled.

17 Claims, 5 Drawing Sheets

(51) Int. Cl.
  *G01D 5/14* (2006.01)
  *G01D 5/244* (2006.01)
(58) Field of Classification Search
  CPC ...... G01R 33/06; G01R 33/063; G01R 33/09;
         G01R 33/093; G01R 33/0052; G01R
         33/18; G01N 27/9033; G01N 27/902;
         G01N 27/9013; G01N 27/904; G01N
         27/223; G01N 27/82; G01N 27/9093
  See application file for complete search history.

(56) References Cited

U.S. PATENT DOCUMENTS

| | | | |
|---|---|---|---|
| 7,019,516 B2 | 3/2006 | Tokunaga et al. | |
| 8,203,329 B2 | 6/2012 | Hohe et al. | |
| 8,421,453 B2 | 4/2013 | Bauer | |
| 8,664,945 B2 | 3/2014 | Laville et al. | |
| 9,097,559 B2 | 8/2015 | Ronnat et al. | |
| 9,116,198 B2 | 8/2015 | Cai et al. | |
| 9,207,100 B2 | 12/2015 | Frachon et al. | |
| 9,746,346 B2 | 8/2017 | Ausserlechner | |
| 9,892,836 B2 | 2/2018 | Ausserlechner | |
| 9,933,448 B1* | 4/2018 | Binder | G01P 3/487 |
| 10,254,130 B2 | 4/2019 | Burgdorf et al. | |
| 2008/0231262 A1 | 9/2008 | Wolf et al. | |
| 2008/0265877 A1* | 10/2008 | Kato | G01D 5/245 324/207.25 |
| 2012/0038359 A1 | 2/2012 | Saruki et al. | |
| 2012/0161755 A1 | 6/2012 | Masson et al. | |
| 2015/0226581 A1* | 8/2015 | Schott | G01D 5/145 324/207.2 |
| 2016/0003586 A1 | 1/2016 | Pace | |
| 2016/0033586 A1* | 2/2016 | Hakenes | G01R 33/07 324/251 |
| 2017/0139016 A1 | 5/2017 | Reimann et al. | |
| 2017/0248445 A1 | 8/2017 | Ausserlechner | |
| 2017/0356967 A1* | 12/2017 | Romero | G01D 3/0365 |
| 2018/0017418 A1 | 1/2018 | Deak | |
| 2018/0087926 A1 | 3/2018 | Ausserlechner | |
| 2018/0196080 A1* | 7/2018 | Binder | G01D 5/147 |
| 2018/0245914 A1* | 8/2018 | Furukawa | G01B 21/22 |
| 2018/0335441 A1* | 11/2018 | Hammerschmidt | G01D 5/12 |
| 2018/0364066 A1* | 12/2018 | Satz | G01D 5/14 |

FOREIGN PATENT DOCUMENTS

| | | |
|---|---|---|
| WO | WO-2006/106490 A3 | 10/2006 |
| WO | WO 2017/140495 A1 | 8/2017 |

OTHER PUBLICATIONS

U.S. Appl. No. 16/542,531; 40 pages (filed Aug. 16, 2019).
Non Final Office Action; U.S. Appl. No. 15/941,216; 20 pages (dated Oct. 31, 2019).
Notice of Allowance; U.S. Appl. No. 15/941,216; 11 pages (dated Apr. 3, 2020).

* cited by examiner

ANGULAR SENSOR SYSTEM AND METHOD OF STRAY FIELD CANCELLATION

TECHNICAL FIELD OF THE INVENTION

The present invention relates generally to magnetic field sensors. More specifically, the present invention relates to systems incorporating the magnetic field sensors for measuring angular position while substantially cancelling stray magnetic fields.

BACKGROUND OF THE INVENTION

Angular sensors, for measuring an angle of rotation or angular position, are implemented in a wide array of automotive and industrial applications. For example, in the automotive industry, angular sensors may be used for valve control, pedal position sensing, steering wheel position sensing, throttle position sensing, motor-shaft position sensing, and multiple other uses. Typically, magnetic field sensors are preferred because their contactless measurement makes them immune to mechanical wear. In these applications, a change in the direction of the magnetic field of a magnet mounted on the moving part, is measured. The magnetic field is not hindered by debris and other non-magnetic materials. Some magnetic field sensors are based upon the magnetoresistive effect in which a material has a tendency to change the value of its electrical resistance in response to an externally-applied magnetic field. Magnetoresistive devices include, for example, Anisotropic Magneto Resistance (AMR) technology, Giant Magneto Resistance (GMR), Tunnel Magneto Resistance (TMR), and so forth.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, the present disclosure concerns systems and methodology for measuring angular rotation of an object. More particularly, systems include an assembly of magnetic field sensors located in the vicinity of a polarized cylindrical object (e.g., a magnet) whose angular rotation can be accurately measured by combining the outputs of the magnetic field sensors. In some embodiments, the systems and methodology can achieve stray magnetic field suppression, without the need for shielding structures, for any type of magnetic field sensor that provides a response to the angle of an external magnetic field while generally not providing a response to the field strength of the external magnetic field. Additionally, the adverse effects of misalignments (e.g., eccentricity, non-uniformities of the magnet, and so forth) can be strongly reduced by the assembly of the magnetic field sensors for improved angular accuracy, sensitivity, and enhanced robustness.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions. Furthermore, some of the figures may be illustrated using various shading and/or hatching to distinguish the different elements produced within the various structural layers. These different elements within the structural layers may be produced utilizing microfabrication techniques of depositing, patterning, etching, and so forth. Accordingly, although different shading and/or hatching is utilized in the illustrations, the different elements within the structural layers may be formed out of the same material.

Figure 1:
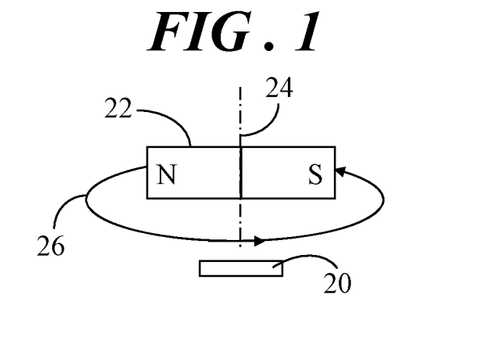
FIG. 1 shows a simplified side view of a magnetic field sensor in proximity to a magnet.

Referring to FIG. 1, FIG. 1 shows a simplified side view of a magnetic field sensor 20 in proximity to a magnet 22. In this example, magnet 20 may be a dipole magnet having a north pole (labeled N) on one side and a south pole (labeled S) on the other side. Magnet 22 may be a permanent magnet in the form of a cylinder, bar, disc, ring, or any other suitable shape. For rotation angle sensing, magnet 22 may be coupled to a rotating object, such as an axle or shaft (not shown). Thus, magnet 22 is configured to rotate about an axis of rotation 24 relative to magnetic field sensor 20. Further, magnet 22 produces a magnetic field 26 that rotates along with magnet 22 relative to magnetic field sensor 20. In this example configuration, magnetic field sensor 20 is vertically displaced below the center of magnet 22. Magnetic field sensor 20 may be a magnetoresistive device, such as AMR, GMR, TMR, or similar technology, that is configured to detect the direction of magnetic field 26 produced by magnet 22.

Figure 2:
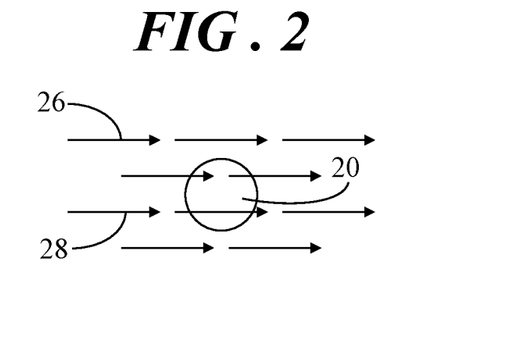
FIG. 2 shows a simplified top view of the magnetic field sensor of FIG. 1 with a magnetic field that is "seen" or detected by the magnetic field sensor.

With reference to FIGS. 1 and 2, FIG. 2 shows a simplified top view of magnetic field sensor 20 with a magnetic field that is "seen" or detected by magnetic field sensor 20. Magnetic field 26 has an in-plane component, denoted by arrows 28, that is detectable by magnetic field sensor 20. Thus, in the ideal configuration represented by FIG. 2, magnetic field sensor 20 measures the in-plane magnetic field component 28 of magnetic field 26.

Figure 3:
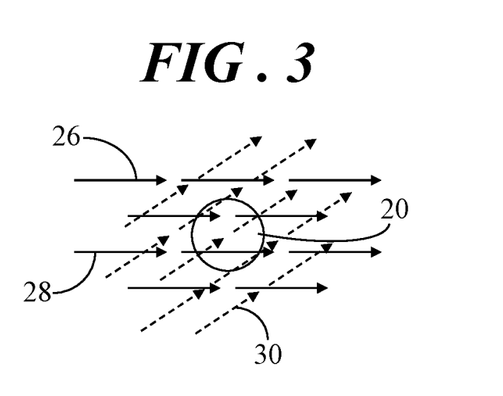
FIG. 3 shows a simplified top view of the magnetic field sensor of FIG. 1 in the presence of an unwanted stray magnetic field.

FIG. 3 shows a simplified top view of magnetic field sensor 20 in the presence of an unwanted stray magnetic field 30, denoted by tilted dashed line arrows. More particularly, FIG. 3 represents both in-plane magnetic field component 28 of magnetic field 26 and stray magnetic field 30. Stray magnetic fields (e.g., stray magnetic field 30) change the magnetic field being measured by magnetic field sensor 20. Stray magnetic field 30 is sometimes referred to as an interference field since it changes the magnetic field being measured by magnetic field sensor 20, and therefore introduces error into the measurement signal.

Figure 4:
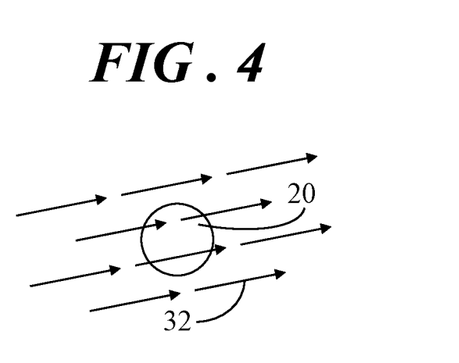
FIG. 4 shows a simplified top view of the magnetic field sensor of FIG. 1 with a magnetic field "seen" or detected by the magnetic field sensor, in which the magnetic field is a combination of the external magnetic field and the stray magnetic field.

Referring now to FIG. 4, FIG. 4 shows a simplified top view of magnetic field sensor 20 with a magnetic field 32, denoted by tilted solid arrows, that is "seen" or detected by magnetic field sensor 20. In the presence of unwanted stray magnetic field 30 (FIG. 3), the detected magnetic field 32 is a combination of in-plane magnetic field component 28 of magnetic field 26 and stray magnetic field 30. Thus, magnetic field sensor 20 is sensitive to both magnetic field 26 produced by magnet 22 and to stray magnetic field 30.

Figure 5:
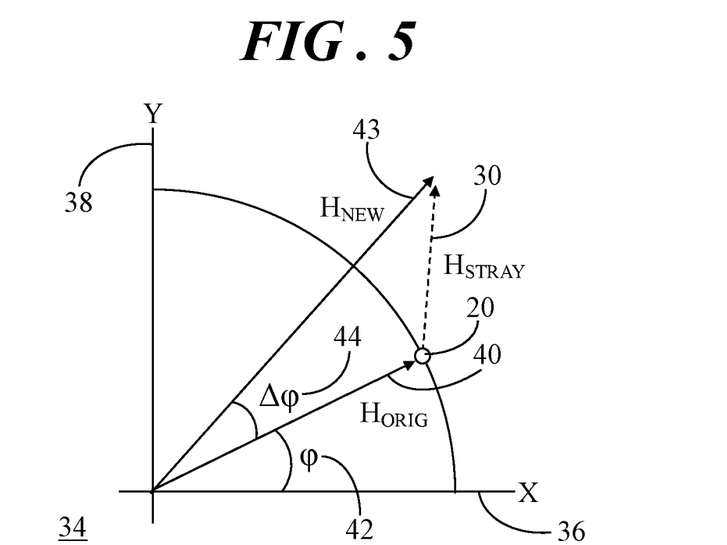
FIG. 5 shows a graph demonstrating angular relations for magnetic field vectors in the presence of the unwanted stray magnetic field.

FIG. 5 shows a graph 34 demonstrating angular relations for magnetic field vectors in the presence of the unwanted stray magnetic field 30. In particular, graph 34 shows vectors in a Cartesian coordinate system that includes an X-axis 36 and a Y-axis 38. In this example, magnetic field sensor 20 is operating in a saturation mode. In general, the saturation mode is when external magnetic fields (e.g., magnetic field 26) are above a certain field strength level (referred to as a saturation field). The magnetic moments in the magnetic field sensor are thus aligned in the same direction of the saturation field. Therefore, the output of the magnetic field sensor device reflects the direction of the external magnetic field and not the field strength of the magnetic field.

In the saturation mode, a first vector 40, labeled $H_{ORIG}$, represents the direction of the magnetic field 26 from magnet 22 at the position of sensor 20 in the absence of stray magnetic field 30. A rotation angle 42, labeled φ, thus represents a rotation angle value relative to an original position of magnet 22 where, for example, the original angular position of magnet 22 is zero and is aligned with X-axis 36. A second vector 43, labeled $H_{NEW}$, represents the detected magnetic field 32 (FIG. 4) in the presence of stray magnetic field 30, labeled $H_{STRAY}$. Thus, second vector 43 represents a combination of $H_{NEW}$ and the sensor response due to stray magnetic field 30. The presence of stray magnetic field 30 leads to an angular error 44, labeled Δφ. Angular error 44 may be wrongly interpreted to be an additional distance that magnet 22 has rotated. Thus, an error condition or inaccurate measurement ensues because a determination may be made that a rotation angle value for magnet 22 is the combination of the actual rotation angle 42 plus the angular error 44 (e.g., φ+Δφ).

Therefore, in the single magnet sensor configuration of FIGS. 1-5, the effects of stray magnetic field 30 cannot be distinguished from the actual rotation of magnet 22. Consequently, neither detection of stray magnetic field 30 nor suppression may be accurately achieved from the output of a single magnetic field sensor 22 that provides only angular information.

The discussion presented above in connection with FIGS. 1-5 pertains to a magnetoresistive magnetic field sensor operating in the saturation mode. Hall effect sensors, which have a linear response to only a single component of a magnetic field, are another commonly used magnetic field sensor technology for angular measurement. However, magnetoresistive sensor technologies, such as AMR, TMR, GMR, and the like, have some distinct advantages over Hall sensors. Magnetoresistive sensor technologies may achieve better noise performance than Hall effect sensors. Additionally, magnetoresistive sensors may be operated reliably at much higher temperatures relative to Hall effect sensors and it may be possible to achieve higher angular accuracies with magnetoresistive sensors relative to Hall effect sensors.

Some of these advantages may be obtained by operating a magnetoresistive sensor in a saturation mode for angular measurements. In the saturation mode, the sensor is almost only sensitive to the angle of the magnetic field (e.g., the field angle) and hardly to strength of the magnetic field (e.g., the field strength). The local magnetic field angle may therefore be measured relatively accurately, without being affected by magnetic field strength. One of the key challenges of implementing magnetoresistive sensor devices is the presence of disturbing magnetic fields of sources (e.g., stray magnetic field 30) other than the above-mentioned magnet 22. As demonstrated in graph 34, stray magnetic field 30 changes the magnetic field being measured by magnetic field sensor, thereby compromising the accuracy of the measured rotation angle. Embodiments described below include systems and methodology for achieving suppression of stray magnetic fields for magnetic field sensors, and in particular magnetoresistive sensors, operating in a saturation mode.

Figure 6:
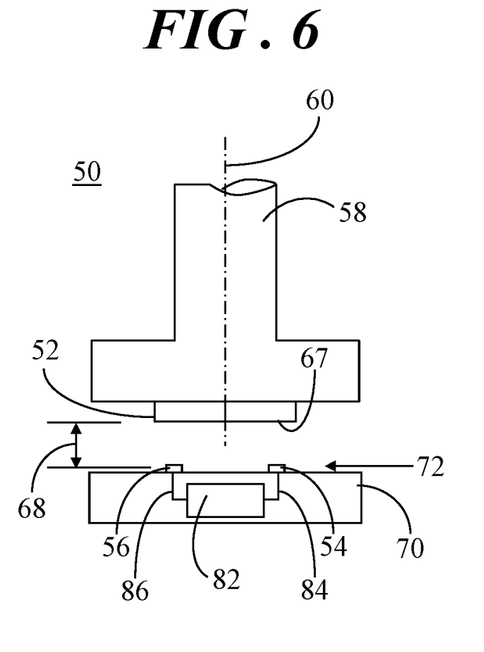
FIG. 6 shows a simplified side view of a system for rotation angle sensing in accordance with an embodiment.

Referring now to FIG. 6, FIG. 6 shows a simplified side view of a system 50 in accordance with an embodiment. In this illustrated configuration, system 50 includes a magnet 52, a first magnetic field sensor 54, and a second magnetic field sensor 56. Magnet 52 may be glued or otherwise attached to a rotatable object 58 such as an axle, shaft, and the like. Thus, rotatable object 58 and magnet 52 (by virtue of its attachment to rotatable object 58) are configured to rotate about an axis of rotation 60. Additionally, magnet 52 is a multipole magnet having four or more poles.

Figure 7:
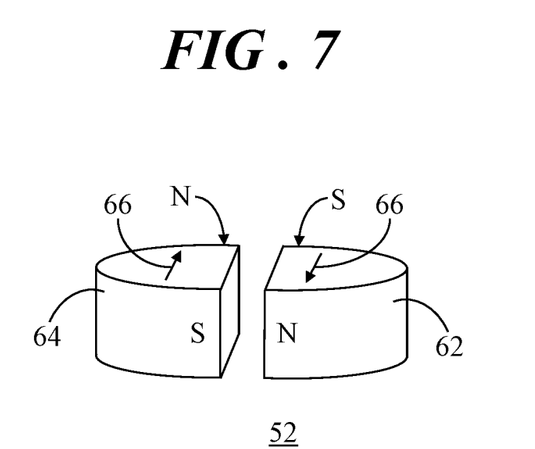
FIG. 7 shows a perspective view of first and second half cylinders that form a magnet used within the system of FIG. 6.
Figure 8:
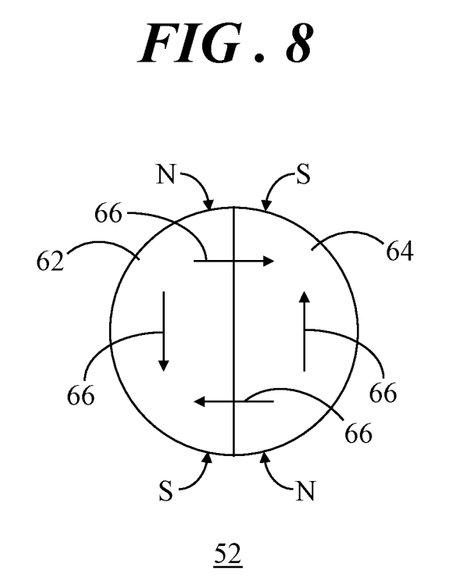
FIG. 8 shows a top view of the magnet of the system of FIG. 6.

Referring concurrently to FIGS. 6-8, FIG. 7 shows a perspective view of first and second half cylinders 62, 64 that form magnet 52 used within system 50 in accordance with an example embodiment, and FIG. 8 shows a top view of magnet 52 after first and second half cylinders 62, 64 are joined together or otherwise combined. Each of first and second half cylinders 62 and 64 may be radially magnetized (e.g., magnetized on the diameter of first and second half cylinders 62, 64) or diametrically magnetized (e.g., magnetized through the diameter of first and second half cylinders 62, 64) with the greatest field strength at the curved surfaces of first and second half cylinders 62, 64. First and second half cylinders 62, 64 may be created from a single piece cylinder or may be joined with one another in opposite polarity such that magnet 52 is a cylindrically-shaped four pole magnet.

Thus, as shown in FIG. 7, the direction of a magnetic field 66 produced by first half cylinder 62 is inverted relative to the direction of magnetic field 66 produced by second half cylinder 64. With particular reference to FIG. 8, after first and second half cylinders 62, 64 are joined there is an inversion of the direction (denoted by oppositely directed arrows) of magnetic field 66 at the top with respect to bottom of magnet 52 in the illustrated top planar view of magnet 52. Likewise, there is an inversion of the direction (denoted by oppositely directed arrows) of magnetic field 66 at the left with respect to the right of magnet 52 in the illustrated top planar view of magnet 52.

Figure 9:
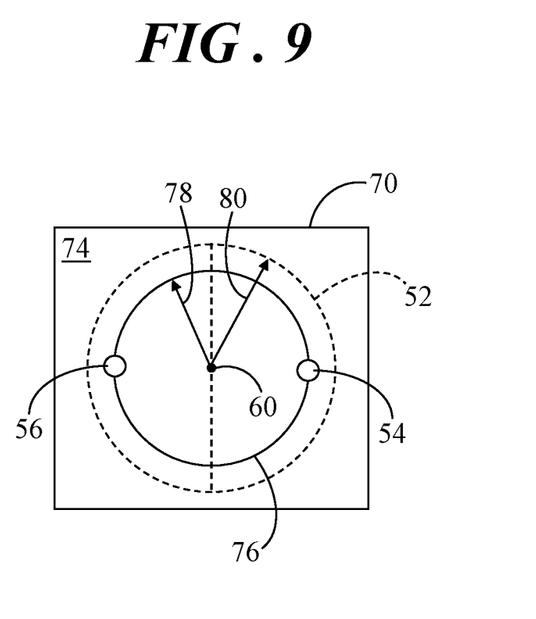
FIG. 9 shows a top view of an arrangement of magnetic field sensors implemented within the system of FIG. 6.

Referring now to FIGS. 6 and 9, FIG. 9 shows a top view of an arrangement of first and second magnetic field sensors 54, 56 implemented within system 20. First and second magnetic field sensors 54, 56 are vertically displaced away from magnet 52. More particularly, first and second magnetic field sensors 54, 56 are spaced apart from a base 67 of magnet 52 such that an air gap 68 is formed between base 67 and first and second magnetic field sensors 54, 56. First and second magnetic field sensors 54, 56 may be fabricated on, or otherwise integrated with, an application specific integrated circuit (ASIC) 70. Thus, first and second magnetic field sensors 54, 56 may be formed in a common (e.g., the same) plane 72 of ASIC 70 that is substantially parallel to and spaced apart from base 67 of magnet 52. In FIGS. 6 and 9, ASIC 70 is enlarged for visibility. In actual practice, magnet 52 is likely to be significantly larger than ASIC 70.

In FIG. 9, a top surface 74 of ASIC 70 is visible. For illustrative purposes, a bisected dashed line circle represents a projection of magnet 52 onto top surface 74 of ASIC 70. First and second magnetic sensors 54, 56 are arranged in two different locations along a circular path 76 about axis of rotation 60 of magnet 52, in which a radius 78 of circular path 76 is no greater than a radial dimension (e.g., a radius) 80 of magnet 52. Further, first and second magnetic sensors 54, 56 are positioned relative to one another such that a first direction of magnetic field 66 at first magnetic field sensor 54 opposes (e.g., is generally opposite from) a second direction of magnetic field 66 at second magnetic field sensor 54. These different directions of magnetic field 66 are represented by the inverted arrows in FIG. 8. In the embodiment shown in FIG. 9, first and second magnetic sensors 54, 56 diametrically oppose one another along circular path 76. That is, first and second magnetic sensors 54, 56 are located at opposite ends of the diameter of circular path 76.

ASIC 70 may implement, among other features, a processing circuit 82 that is customized to function with first and second magnetic field sensors 54, 56. Processing circuit 82 is represented in ASIC 70 of FIG. 6 by a simple block with a first conductive pathway 84 interconnecting first magnetic field sensor 54 to processing circuit 82, and with a second conductive pathway 86 interconnecting second magnetic field sensor 56 to processing circuit 82. Those skilled in the art will recognize that processing circuit 82 can encompass a wide variety of processing, control, or other structures. Further, although first and second magnetic field sensors 54, 56 are described herein as being integrated with ASIC 70, in other configurations first and second magnetic field sensors 54, 56 may be packaged separately from an ASIC that includes processing circuit 82. Therefore, in the interest of brevity and minimization of any risk of obscuring the principles and concepts of the various embodiments, further discussion of such structures, if any, will be limited to the essentials with respect to the principles and concepts of the various embodiments.

First and second magnetic field sensors 54, 56 may be magnetoresistive sense elements (e.g., AMR, GMR, TMR and other related technologies). Thus, first magnetic field sensor 54 is configured to produce a first output signal in response to magnetic field 66, which is communicated to processing circuit 82 via first conductive pathway 84. Similarly, second magnetic field sensor 56 is configured to produce a second output signal in response to magnetic field 66, which is communicated to processing circuit 82 via second conductive pathway 86.

First and second magnetic field sensors 54, 56 are further configured to operate in the saturation mode. As mentioned briefly above, in the saturation mode, the state of the field strength, |H|, at each of first and second magnetic field sensors 54, 56 is sufficiently large such that each of magnetic field sensors 54, 56 is almost exclusively sensitive to the direction of the field strength, |H|, and not to its absolute value. The saturation condition is reached when field strength, |H|, is significantly greater than HKeff, where HKeff is a field value that is derived from the sum of the sensor's demagnetization energy term and its anisotropy energy term (as a function of the magnetization angle). Magnetic coupling energy terms are additionally involved for complex multilayer structures like GMR and TMR and may contribute to HKeff. In thin-film NiFe AMR sensors and in GMR and TMR sensors these can add up to a few kA/m (kiloampere/meter). The magnetization of the magnetoresistive sensor for ↑H|>>HKeff is almost in the same direction as the total field strength, φH. Hence, a change in the field strength (and not the field angle) would not change or minimally change the response of the magnetoresistive sensor (e.g., first and second magnetic field sensors 54, 56).

Figure 10:
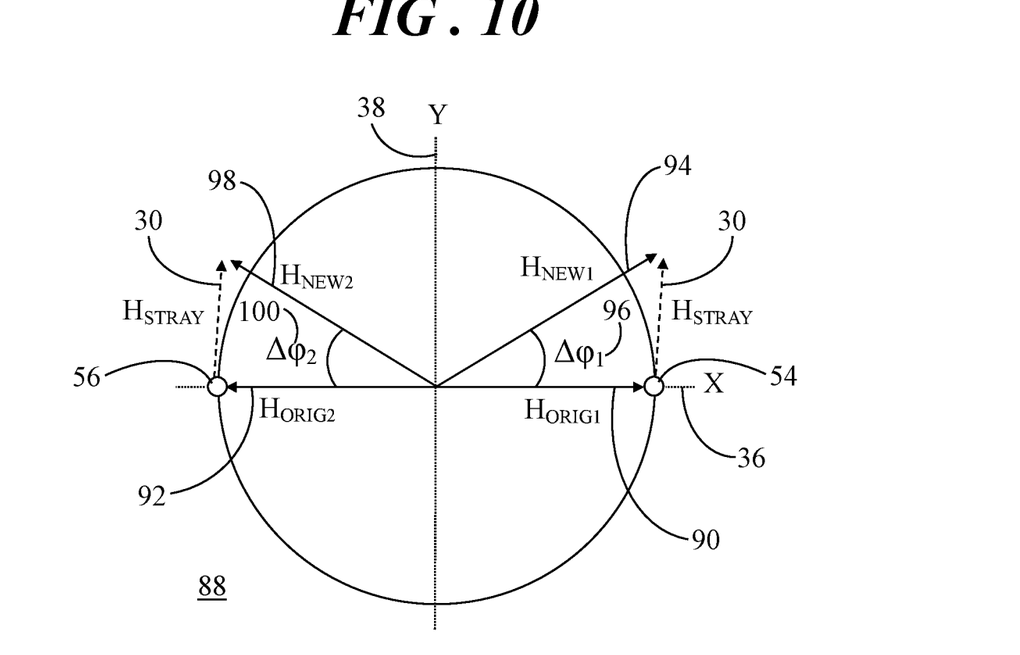
FIG. 10 shows a graph demonstrating angular relations for magnetic field vectors in the presence of the unwanted stray magnetic field.

Referring now to FIG. 10, FIG. 10 shows a graph 88 demonstrating angular relations for magnetic field vectors in the presence of the unwanted stray magnetic field 30, labeled $H_{STRAY}$. That is, graph 88 demonstrates the influence of unwanted magnetic stray field 30, $H_{STRAY}$, on the measurement magnetic field vectors at the positions of first and second magnetic field sensors 54, 56. Like graph 34 of FIG. 5, graph 88 shows vectors in a Cartesian coordinate system that includes X-axis 36 and Y-axis 38. Since first and second magnetic field sensors 54, 56 are operating in the saturation mode, their respective first and second output signals reflect the direction of magnetic field 66 (FIG. 7) and not the field strength of magnetic field 66. In the saturation mode, a vector 90, labeled $H_{ORIG1}$, represents the direction of the field strength of magnetic field 66 at the position of first magnetic field sensor 54 in the absence of stray magnetic field 30. In this example, the rotation angle, $\varphi_1$, for first magnetic field sensor 54 is 180°. Likewise, a vector 92, labeled $H_{ORIG2}$, represents the direction of the field strength of magnetic field 66 at the position of second magnetic field sensor 56 in the absence of stray magnetic field 30. Again, a rotation angle, $\varphi_2$, for second magnetic field sensor 56 is 180°. Accordingly, rotation angles, $\varphi_1$ and $\varphi_2$, are not visible in FIG. 10.

A first output signal (e.g., voltage response) produced by first magnetic field sensor 54 corresponds with the direction of a first vector 94, labeled $H_{NEW1}$, and represents the direction of the total fields when stray magnetic field 30, labeled $H_{STRAY}$, is introduced. The introduction of stray magnetic field 30 at first magnetic field sensor 54 leads to an angular error 96, labeled $\Delta\varphi_1$. Thus, the first output signal corresponding with first vector 94 includes a first stray field component, e.g., angular error 96. Similarly, a second output signal (e.g., voltage response) produced by second magnetic field sensor 56 corresponds with the direction of a second vector 98, labeled $H_{NEW2}$, and represents the total fields when stray magnetic field 30, labeled $H_{STRAY}$, is introduced. The introduction of stray magnetic field 30 at second magnetic field sensor 56 leads to an angular error 100, labeled $\Delta\varphi_2$. Thus, the second output signal corresponding with second vector 98 includes a second stray field component, e.g., angular error 100. However, the sign of angular error 100, $\Delta\varphi_2$, is opposite that of angular error 96, $\Delta\varphi_1$.

Processing circuit 82 (FIG. 6) is configured to combine first and second output signals 94, 98 to obtain a rotation angle value (e.g., a compensated output angle) in which the first and second stray components (e.g., angular errors 96, 100) are substantially canceled. By way of example, processing circuit may at least partially cancel angular error 96, 100 by calculating an arithmetic mean which can be expressed as follows:

$$\varphi_{OUT} = \frac{\varphi_{NEW1} + \varphi_{New2}}{2} = \frac{(\varphi_1 + \Delta\varphi_1) + (\varphi_2 + \Delta\varphi_2)}{2} \approx \varphi_{IN} \quad (1)$$

In the expression (1), $\varphi_{IN}$ is the input angle representing the position of magnet 52 (FIG. 6) relative to first and second magnetic field sensors 54, 46. Again, in this example, the input angle is 180° and, thus, the rotation angles, $\varphi_1$ and $\varphi_2$ are not visible in FIG. 10. The expressions $\varphi_{NEW1}$ and $\varphi_{NEW2}$ represent the total angles, the expressions $\Delta\varphi_1$ and $\Delta\varphi_2$ represent angular errors 96, 100, and the expression $\varphi_{OUT}$ represents the compensated output angle. Therefore, the compensated output angle is the combined output signals 94, 96 in which angular errors 96, 100 of $\Delta\varphi_1$ and $\Delta\varphi_2$ generally cancel one another to yield a rotation angle value, $\varphi_{OUT}$. Accordingly, for two sensors (e.g., first and second magnetic field sensors 54, 56) that measure magnetic fields ($H_{ORIG1}$ and $H_{ORIG2}$) which have opposite directions, stray magnetic field 30 will have approximately opposite effects on the angles of the total fields, $H_{NEW1}$ and $H_{NEW2}$. However, both original magnetic fields ($H_{ORIG1}$ and $H_{ORIG2}$) should rotate synchronously in the same direction so that the opposite phase is maintained over the entire 360° rotation.

Figure 11:
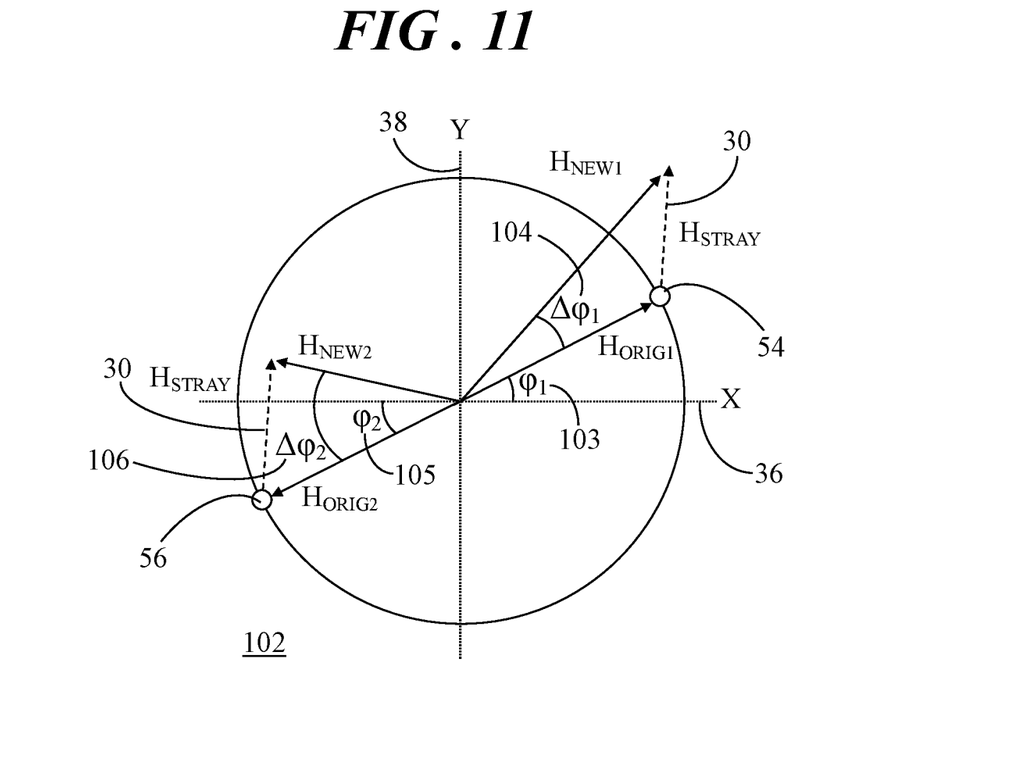
FIG. 11 shows another graph demonstrating angular relations for magnetic field vectors in the presence of the unwanted stray magnetic field.

Referring now to FIG. 11 shows another graph 102 demonstrating the sensitivity of first and second magnetic field sensors 54, 56 to the unwanted stray magnetic field 30, labeled $H_{STRAY}$. Graph 102 shows rotation angles 103, 105 of $\varphi_1$ and $\varphi_2$ and angular errors 104, 106 of $\Delta\varphi_1$ and $\Delta\varphi_2$. In system 50 (FIG. 6) having only two magnetic field sensors, compensation for angular errors 104, 106 of $\Delta\varphi_1$ and $\Delta\varphi_2$ may not be exact in magnitude. That is, $\Delta\varphi_1 \neq -\Delta\varphi_2$ for all input angles $\varphi_{IN}$. Therefore, following compensation in accordance with expression (1), the output angle, $\varphi_{OUT}$, may not equal the input angle, $\varphi_{IN}$. However, some compensation for angular error will occur. Indeed, the compensation strategy utilizing two magnetic field sensors operating in saturation may reduce the angular error by one or more orders of magnitude relative to the single magnetic field configuration of FIGS. 1-5.

Figure 12:
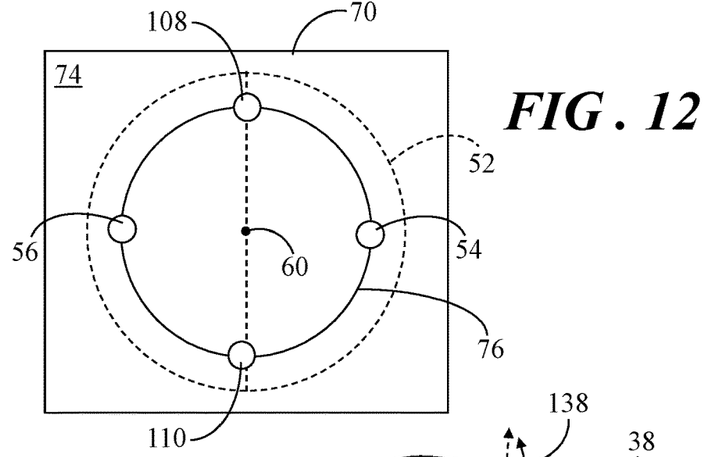
FIG. 12 shows a top view of another arrangement of magnetic field sensors that may be implemented within the system of FIG. 6 in accordance with an alternative embodiment.

FIG. 12 shows a top view of another arrangement of magnetic field sensors that may be implemented within system 50 (FIG. 6) in accordance with an alternative embodiment. It may be advantageous to further reduce the angular error by including additional sensors. Thus, the arrangement shown in FIG. 12 includes first and second magnetic field sensors 54, 56 as discussed in detail above. The arrangement shown in FIG. 12 further includes third and fourth magnetic field sensors 108, 110, respectively, diametrically opposing one another and arranged ±90° about circular path 76 relative to first and second magnetic field sensors 54, 56. Thus, third and fourth magnetic field sensors 108, 110 are positioned relative to one another such that a direction of magnetic field 66 (FIG. 8) at third magnetic field sensor 108 opposes a direction of magnetic field 66 at fourth magnetic field sensor 110. These different directions of magnetic field 66 are represented by the inverted arrows in FIG. 8

Figures 13, 14:
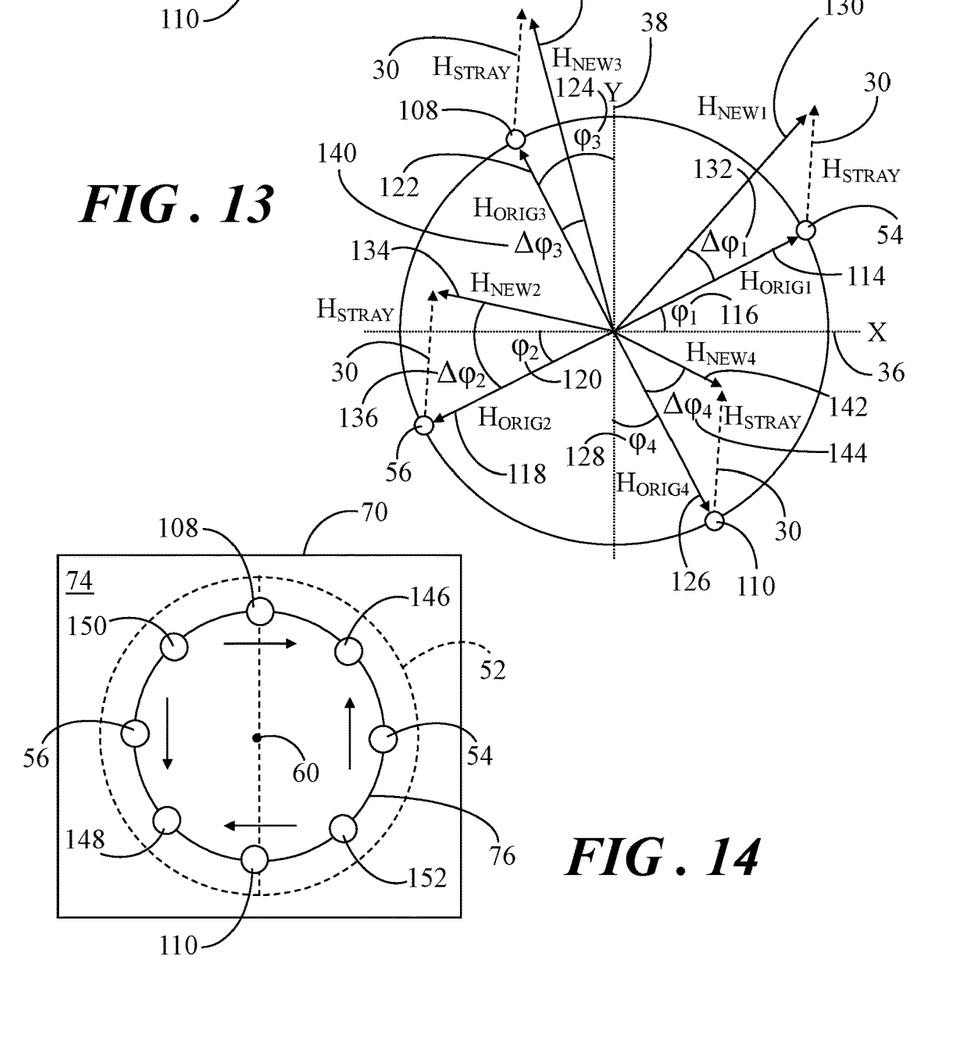
FIG. 13 shows a graph demonstrating angular relations for magnetic field vectors in the presence of the unwanted stray magnetic field.
FIG. 14 shows a top view of another arrangement of magnetic field sensors that may be implemented within the system of FIG. 6 in accordance with an alternative embodiment.

FIG. 13 shows a graph demonstrating angular relations for magnetic field vectors in the presence of the unwanted stray magnetic field 30, labeled $H_{STRAY}$. Each of first, second, third, and fourth magnetic field sensors 54, 56, 108, 110 are operating in the saturation mode. Hence, their respective output signals reflect the direction of magnetic field 66 (FIG. 8) and not the field strength of magnetic field 66.

In the saturation mode, a vector 114, labeled $H_{ORIG1}$, representing the direction of the field strength of magnetic field 66 at the position of first magnetic field sensor 54 in the absence of stray magnetic field 30 and a rotation angle 116, $\varphi_1$, for first magnetic field sensor 54 are shown. In a similar manner, a vector 118, labeled $H_{ORIG2}$, representing the direction of the field strength of magnetic field 66 at the position of second magnetic field sensor 56 in the absence of stray magnetic field 30 and a rotation angle 120, $\varphi_2$, for second magnetic field sensor 54 are shown. A vector 122, labeled $H_{ORIG3}$, representing the direction of the field strength of magnetic field 66 at the position of third magnetic field sensor 108 in the absence of stray magnetic field 30 and a rotation angle 124, $\varphi_3$, for third magnetic field sensor 108 are shown. And a vector 126, labeled $H_{ORIG4}$, representing the direction of the field strength of magnetic field 66 at the position of fourth magnetic field sensor 110 in the absence of stray magnetic field 30 and a rotation angle 128, $\varphi_4$, for fourth magnetic field sensor 110 are shown.

A first output signal (e.g., voltage response) produced by first magnetic field sensor 54 corresponds with the direction of a first vector 130, labeled $H_{NEW1}$, and represents the direction of the total fields when stray magnetic field 30, labeled $H_{STRAY}$, is introduced. The introduction of stray magnetic field 30 at first magnetic field sensor 54 leads to an angular error 132, labeled $\Delta\varphi_1$. Thus, the first output signal corresponding with the direction of first vector 130 includes a first stray field component, e.g., angular error 132. Similarly, a second output signal (e.g., voltage response) produced by second magnetic field sensor 56 corresponds with the direction of a second vector 134, labeled $H_{NEW2}$, and represents the total fields when stray magnetic field 30 is introduced. The introduction of stray magnetic field 30 at second magnetic field sensor 56 leads to an angular error 136, labeled $\Delta\varphi_2$. Thus, the second output signal corresponding with the direction of second vector 134 includes a second stray field component, e.g., angular error 136.

A third output signal (e.g., voltage response) produced by third magnetic field sensor 108 corresponds with the direction of a third vector 138, labeled $H_{NEW3}$, and represents the direction of the total fields when stray magnetic field 30 is introduced. The introduction of stray magnetic field 30 at third magnetic field sensor 108 leads to an angular error 140, labeled $\Delta\varphi_3$. Thus, the third output signal corresponding with the direction of third vector 138 includes a third stray field component, e.g., angular error 140. A fourth output signal (e.g., voltage response) produced by fourth magnetic field sensor 110 corresponds with the direction of a fourth vector 142, labeled $H_{NEW4}$, and represents the total fields when stray magnetic field 30 is introduced. The introduction of stray magnetic field 30 at fourth magnetic field sensor 110 leads to an angular error 144, labeled $\Delta\varphi_4$. Thus, the fourth output signal corresponding with the direction of fourth vector 142 includes a fourth stray field component, e.g., angular error 144.

Processing circuit 82 (FIG. 6) may be additionally coupled to third and fourth magnetic field sensors 108, 110, and may be further configured to combine the first, second, third, and fourth output signals (corresponding with first, second, third, and fourth vectors 130, 134, 138, 142, respectively) to obtain a rotation angle value (e.g., a compensated output angle) in which the first, second, third, and fourth stray components (e.g., angular errors 132, 136, 140, 144) are substantially canceled. Again, processing circuit 82 may cancel angular errors 132, 136, 140, 144 by calculating the arithmetic mean as follows:

$$\varphi_{OUT} = \frac{\varphi_{NEW1} + \varphi_{New2} + \varphi_{NEW3} + \varphi_{NEW4}}{4} \quad (2)$$

$$= \frac{(\varphi_1 + \Delta\varphi_1) + (\varphi_2 + \Delta\varphi_2) + (\varphi_3 + \Delta\varphi_3) + (\varphi_4 + \Delta\varphi_4)}{4}$$

$$= \frac{\varphi_1 + \varphi_2 + \varphi_3 + \varphi_4}{4} \approx \varphi_{IN}$$

Accordingly, the compensation strategy utilizing four magnetic field sensors operating in saturation in the arrangement of FIG. 12 may reduce the angular error by two or more orders of magnitude relative to the single magnetic field sensor configuration of FIGS. 1-5 and by one or more orders of magnitude relative to the two magnetic field sensor configuration of FIGS. 6-11.

FIG. 14 shows a top view of another arrangement of magnetic field sensors that may be implemented system 50 (FIG. 6) in accordance with yet another alternative embodiment. Further reductions in angular error may be achieved by including additional sensors. Thus, the arrangement shown in FIG. 14 includes a total of eight magnetic field sensors. The arrangement includes first, second, third, and fourth magnetic field sensors 54, 56, 108, 110, as discussed above. The arrangement shown in FIG. 14 further includes fifth and sixth magnetic field sensors 146, 148 diametrically opposing one another and seventh and eighth magnetic field sensors 150, 152 diametrically opposing one another. Fifth, sixth, seventh, and eighth magnetic field sensors 146, 148, 150, 152 are arranged ±45° about circular path 76 relative to first, second, third, and fourth magnetic field sensors 54, 56, 108, 110 to yield a differential arrangement of sensors.

Although arrangements of two, four, and eight magnetic field sensors are shown herein, the quantity and positions of the magnetic field sensors may vary in accordance with the accuracy and size requirements of a particular application. In particular, other arrangements of pairs of magnetic field sensors may be defined in which the magnetic field at the locations of the magnetic field sensors has the opposite direction.

Methodology performed by system 50 for determining the angular position of magnet 52, configured to produce a magnetic field, thus entails operating two or more magnetic field sensors (e.g., magnetic field sensors 54, 56, 108, 110) in a saturation mode in which the magnetic field sensors are sensitive to a direction of the magnetic field and largely insensitive to a field strength of the magnetic field. Each magnetic field sensor produces an output signal that is indicative of the direction of the magnetic field at the location of the magnetic field sensor, the output signal including a stray field component. The output signals from the two or more magnetic field sensors are combined at the processing circuit 82 to obtain a rotation angle value of the magnet. The output signals may be combined by taking an arithmetic mean, which substantially cancels the stray field components to yield a rotation angle value that has been corrected, or otherwise compensated, for angular error caused by a stray magnetic field.

Figure 15:
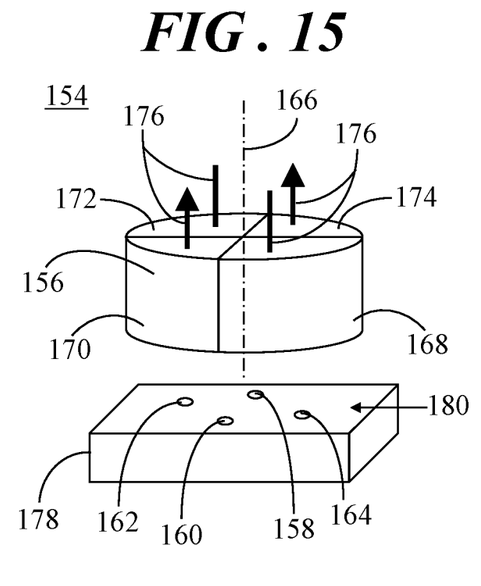
FIG. 15 shows a simplified perspective view of another system for rotation angle sensing in accordance with an embodiment.

Referring now to FIG. 15, FIG. 15 shows a simplified perspective view of another system 154 in accordance with an embodiment. In this illustrated configuration, system 154 includes a magnet 156, and an assembly of four magnetic field sensors 158, 160, 162, 164. As discussed previously, magnet 156 may be glued or otherwise attached to a rotatable object (not shown) and is thus configured to rotate about an axis of rotation 166.

Figure 16:
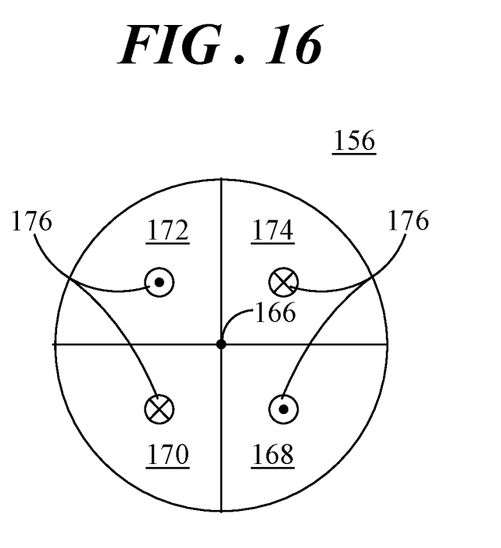
FIG. 16 shows a bottom view of a magnet of the system of FIG. 15.

Referring concurrently to FIGS. 15 and 16, FIG. 16 shows a bottom view of magnet 156. In this illustrated embodiment, magnet 156 includes a first quarter cylinder 168, a second quarter cylinder 170, a third quarter cylinder 172, and a fourth quarter cylinder 174, each of which is axially magnetized. That is, each of quarter cylinders 168, 170, 172, 174 is magnetized along its length so that the north and south poles are on the opposing flat bases. First, second, third, and fourth quarter cylinders 168, 170, 172, 174 may be created from a single piece cylinder or may be joined such that magnet 156 is a cylindrically-shaped eight pole magnet. Thus, as shown in FIGS. 15 and 16, the direction of a magnetic field 176 produced by first and third quarters 168, 172 is inverted relative to the direction of magnetic field 176 produced by second and fourth quarter cylinders 170, 174. In FIG. 16, an encircled dot represents the direction of magnetic field 176 as being directed out of the page, and an encircled "X" represents the direction of magnetic field as being directed into the page.

Figure 17:
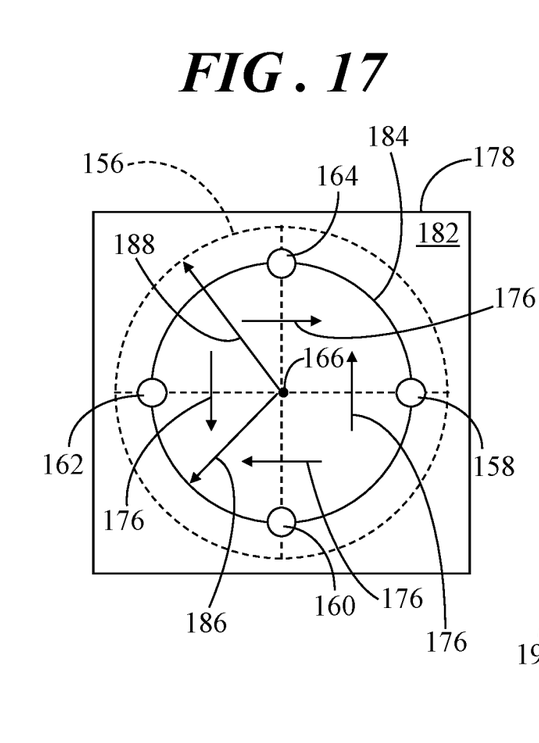
FIG. 17 shows a top view of an arrangement of magnetic field sensors that may be implemented within the system of FIG. 15.

Referring now to FIGS. 15 and 17, FIG. 17 shows a top view of an arrangement of magnetic field sensors 158, 160, 162, 164 implemented within system 154 (FIG. 15). Magnetic field sensors 158, 160, 162, 164 are vertically displaced away from magnet 156, and more particularly, magnetic field sensors 158, 160, 162, 164 are spaced apart from the base of magnet 156. Magnetic field sensors 158, 160, 162, 164 may be fabricated on, or otherwise integrated with, an ASIC 178. Thus, magnetic field sensors 158, 160, 162, 164 may be formed in a common (e.g., the same) plane 180 of ASIC 178 that is substantially parallel to and spaced apart from the base of magnet 156.

In FIG. 17, a top surface 182 of ASIC 178 is visible. For illustrative purposes, a dashed line circle represents a projection of magnet 156 onto top surface 182 of ASIC 178. Like the previously described embodiments, magnetic field sensors 158, 160, 162, 164 are arranged in different locations along a circular path 184 about axis of rotation 166 of magnet 156, in which a radius 186 of circular path 184 is no greater than a radial dimension (e.g., a radius) 188 of magnet 156. In FIG. 17, arrows representing the direction of magnetic field 176 highlight an inversion of the direction of magnetic field 176 at the top with respect to the bottom of the image and at the left with respect to the right side of the image. As with the previous embodiment, this inversion can be used to apply the compensation strategy discussed above of taking the arithmetic mean of the angular output signals of all of the individual magnetic field sensors 158, 160, 162, 164.

Figure 18:
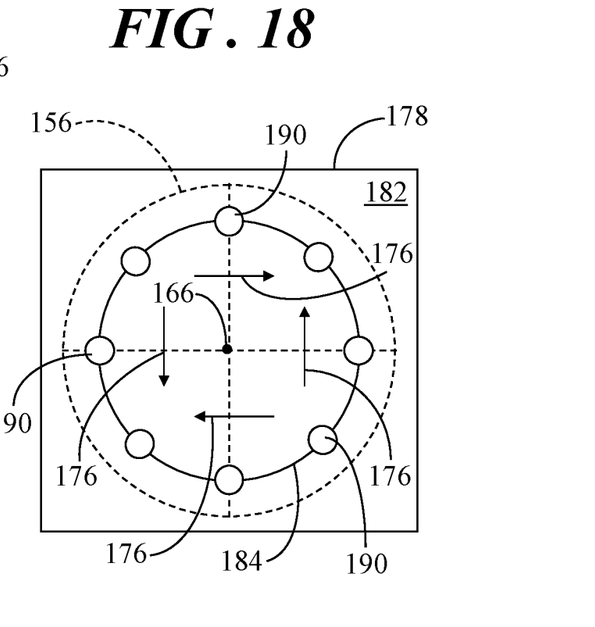
FIG. 18 shows a top view of an arrangement of magnetic field sensors that may be implemented within the system of FIG. 15 in accordance with another embodiment.

FIG. 18 shows a top view of an arrangement of magnetic field sensors that may be implemented within the system 154 (FIG. 15) in accordance with another embodiment. Further reductions in angular error may be achieved in the axially magnetized configurations by including additional sensors. Thus, the arrangement shown in FIG. 18 includes a total of eight magnetic field sensors 190, spaced apart along circular path 184 by ±45°. Again, the quantity and positions of the magnetic field sensors in an axially magnetized configuration may vary in accordance with the accuracy and size requirements of a particular application.

Embodiments described herein entail systems and methodology for measuring angular rotation of an object. An embodiment of a system comprises a magnet having four or more poles and an axis of rotation, wherein the magnet is configured to produce a magnetic field, a first magnetic field sensor configured to produce a first output signal in response to the magnetic field, and a second magnetic field sensor configured to produce a second output signal in response to the magnetic field, each of the first and second magnetic field sensors being configured to operate in a saturation mode such that the first output signal is indicative of a first direction of the magnetic field at the first magnetic field sensor and the second output signal is indicative of a second direction of the magnetic field at the second magnetic field sensor.

Another embodiment of a system comprises a magnet having four or more poles and an axis of rotation, wherein the magnet is configured to produce a magnetic field, a first magnetic field sensor configured to produce a first output signal in response to the magnetic field, and a second magnetic field sensor configured to produce a second output signal in response to the magnetic field, each of the first and second magnetic field sensors being configured to operate in a saturation mode such that the first output signal is indicative of a first direction of the magnetic field and the second output signal is indicative of a second direction of the magnetic field, wherein the first and second magnetic field sensors are arranged relative to one another such that the first direction of the magnetic field at the first magnetic field sensor opposes the second direction of the magnetic field at the second magnetic field sensor. The system further comprises a processing circuit configured to receive the first and second output signals and combine the first and second output signals to obtain a rotation angle value in which the effects of a first stray field component of the first output signal and a second stray field component of the second output signal are at least partially canceled.

An embodiment of a method for determining the angular position of a magnet, the magnet having four or more poles and an axis of rotation, wherein the magnet is configured to produce a magnetic field, the method comprising operating a first magnetic field sensor and a second magnetic field sensor in a saturation mode in which the first and second magnetic field sensors are sensitive to a direction of the magnetic field, producing a first output signal at the first magnetic field sensor, the first output signal being indicative of a first direction of the magnetic field at a first location of the first magnetic field sensor, producing a second output signal at the second magnetic field sensor, the second output signal being indicative of a second direction of the magnetic field at a second location of the second magnetic field sensor, and combining the first and second output signals to obtain a rotation angle value of the magnet in which the effects of a first stray field component of the first output signal and a second stray field component of the second output signal are at least partially canceled.

Thus, systems include an assembly of magnetic field sensors located in the vicinity of a polarized object (e.g., a magnet) whose angular rotation can be accurately measured by combining the outputs of the magnetic field sensors. In some embodiments, the systems and methodology can achieve stray magnetic field suppression, without the need for shielding structures, for any type of magnetic field sensor that provides a response to the angle of an external magnetic field while generally not providing a response to the field strength of the external magnetic field. Additionally, the adverse effects of misalignments (e.g., eccentricity, non-uniformities of the magnet, and so forth) can be strongly reduced by the assembly of the magnetic field sensors for improved angular accuracy, sensitivity, and enhanced robustness.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system comprising:
   a magnet having four or more poles and an axis of rotation, wherein the magnet is configured to produce a magnetic field;
   a first magnetoresistive (MR) sensor configured to produce a first output signal in response to the magnetic field;
   a second MR sensor configured to produce a second output signal in response to the magnetic field, each of the first and second MR sensors being configured to operate in a saturation mode such that the first output signal is indicative of a first direction of the magnetic field at the first MR sensor and the second output signal is indicative of a second direction of the magnetic field at the second MR sensor; and
   a processing circuit coupled to the first and second MR sensors and configured to combine the first and second output signals to obtain a rotation angle value in which the effects of a first stray field component of the first output signal and a second stray field component of the second output signal are at least partially canceled.

2. The system of claim 1 further comprising:
a third MR sensor configured to produce a third output signal in response to the magnetic field; and
a fourth MR sensor configured to produce a fourth output signal in response to the magnetic field, wherein each of the third and fourth MR sensors are configured to operate in the saturation mode such that the third output signal is indicative of a third direction of the magnetic field and the fourth output signal is indicative of a fourth direction of the magnetic field, and the processing circuit is further coupled to the third and fourth MR sensors and is further configured to combine the third and fourth output signals with the first and second output signals to obtain the rotation angle value in which the effects of a third stray field component of the third output signal and a fourth stray field component of the fourth output signal at least partially canceled.

3. The system of claim 1 wherein the magnet comprises a first half cylinder and a second half cylinder, each of the first and second half cylinders being diametrically magnetized.

4. The system of claim 1 wherein the first and second MR sensors are spaced apart from a base of the magnet such that a gap is formed between the base and the first and second MR sensors, the base being perpendicular to the axis of rotation.

5. The system of claim 1 wherein the magnet comprises a first quarter cylinder, a second quarter cylinder, a third quarter cylinder, and a fourth quarter cylinder, each of the first, second, third, and fourth quarter cylinders being axially magnetized.

6. The system of claim 1 wherein the first and second MR sensors are formed in a common plane oriented substantially parallel to a base of the magnet.

7. The system of claim 1 wherein the first and second MR sensors are positioned relative to one another such that the first direction of the magnetic field at the first MR sensor opposes the second direction of the magnetic field at the second MR sensor.

8. The system of claim 1 wherein the first and second MR sensors are arranged at two locations along a circular path about the axis of rotation of the magnet, the circular path having a radius that is no greater than a radial dimension of the magnet.

9. The system of claim 8 wherein the first and second MR sensors diametrically oppose one another along the circular path.

10. The system of claim 8 further comprising additional MR sensors, each of which is configured to produce a distinct output signal in response to the magnetic field, each of the additional MR sensors being configured to operate in the saturation mode, and the additional MR sensors being arranged at additional locations along the circular path.

11. A system comprising:
a magnet having four or more poles and an axis of rotation, wherein the magnet is configured to produce a magnetic field;
a first magnetoresistive (MR) sensor configured to produce a first output signal in response to the magnetic field;
a second MR sensor configured to produce a second output signal in response to the magnetic field, each of the first and second MR sensors being configured to operate in a saturation mode such that the first output signal is indicative of a first direction of the magnetic field and the second output signal is indicative of a second direction of the magnetic field, wherein the first and second MR sensors are arranged relative to one another such that the first direction of the magnetic field at the first MR sensor opposes the second direction of the magnetic field at the second MR sensor; and
a processing circuit configured to receive the first and second output signals and combine the first and second output signals to obtain a rotation angle value in which the effects of a first stray field component of the first output signal and a second stray field component of the second output signal are at least partially canceled.

12. The system of claim 11 wherein the first and second MR sensors are formed in a common plane oriented substantially parallel to a base of the magnet, the base being perpendicular to the axis of rotation.

13. The system of claim 11 wherein the first and second MR sensors are arranged at two locations along a circular path about the axis of rotation of the magnet, the circular path having a radius that is no greater than a radial dimension of the magnet.

14. The system of claim 13 wherein the first and second MR sensors diametrically oppose one another along the circular path.

15. A method for determining the angular position of a magnet, the magnet having four or more poles and an axis of rotation, wherein the magnet is configured to produce a magnetic field, the method comprising:
operating a first magnetoresistive (MR) sensor and a second MR sensor in a saturation mode in which the first and second MR sensors are sensitive to a direction of the magnetic field;
producing a first output signal at the first MR sensor, the first output signal being indicative of a first direction of the magnetic field at a first location of the first MR sensor;
producing a second output signal at the second MR sensor, the second output signal being indicative of a second direction of the magnetic field at a second location of the second MR sensor; and
combining the first and second output signals to obtain a rotation angle value of the magnet in which the effects of a first stray field component of the first output signal and a second stray field component of the second output signal are at least partially canceled.

16. The method of claim 15 further comprising positioning the first and second MR sensors relative to one another such that the first direction of the magnetic field at the first location opposes the second direction of the magnetic field at the second location.

17. The method of claim 15 further comprising:
operating a third MR sensor and a fourth MR sensor in the saturation mode;
producing a third output signal at the third MR sensor, the third output signal being indicative of a third direction of the magnetic field at a third location of the third MR sensor;
producing a fourth output signal at the fourth MR sensor, the fourth output signal being indicative of a fourth direction of the magnetic field at a fourth location of the fourth MR sensor; and
combining the third and fourth output signals with the first and second output signals to obtain the rotation angle value of the magnet in which the effects of a third stray field component of the third output signal and a fourth stray field component of the fourth output signal are additionally at least partially canceled.

\* \* \* \* \*